(12) United States Patent
Jang et al.

(10) Patent No.: US 7,738,574 B2
(45) Date of Patent: Jun. 15, 2010

(54) CONVOLUTIVE BLIND SOURCE SEPARATION USING RELATIVE OPTIMIZATION

(75) Inventors: In-Seon Jang, Gyeonggi-do (KR); Ki-Joeng Nam, Gyeongbuk (KR); Hee-Youl Choi, Daegu (KR); Seung-Jin Choi, Gyeongbuk (KR); Kyeong-Ok Kang, Daejon (KR)

(73) Assignees: Electronics and Telecommunications Research Institute, Daejeon (KR); Postech Foundation, Gyeongbuk (KR)

( * ) Notice: Subject to any disclaimer, the term of this patent is extended or adjusted under 35 U.S.C. 154(b) by 937 days.

(21) Appl. No.: 11/478,212

(22) Filed: Jun. 29, 2006

(65) Prior Publication Data

US 2007/0058737 A1    Mar. 15, 2007

(30) Foreign Application Priority Data

Nov. 9, 2005    (KR) .................... 10-2005-0107046

(51) Int. Cl.
*H04B 1/10*    (2006.01)
(52) U.S. Cl. ..................................... 375/260; 375/350
(58) Field of Classification Search ................ 375/259, 375/260, 316, 340, 346, 350
See application file for complete search history.

(56) References Cited

U.S. PATENT DOCUMENTS

2005/0240642 A1* 10/2005 Parra et al. .................. 708/400
2006/0067541 A1*  3/2006 Yamada et al. ................ 381/98

FOREIGN PATENT DOCUMENTS

KR    2001-0042537    5/2001

OTHER PUBLICATIONS

Bronstein et al., "Relative Optimization for Blind Deconvolution," Jun. 2005, IEEE Transactions on Signal Processing, vol. 53, Issue 6, 2018-2026.*
Ziehe et al., "A Fast Algorithm for Joint Diagonalization with Application to Blind Source Separation," Sep. 23, 2003, Bliss Technical Report, 1-14.*
'Convolutive Blind Separation of Non-Stationary Sources' Parra et al., IEEE Transactions on Speech and Audio Processing, vol. 8, No. 3, May 2000, pp. 320-327.
Algorithms for Approximate Joint Diagonalization of Hermitian Matrices: Relative Gradient, Relative Newton and Relative Trust-Region, Seungjin Choi, Department of Computer Science & Engineering, Pohang University of Science and Technology, Korea.

* cited by examiner

*Primary Examiner*—David B Lugo
(74) *Attorney, Agent, or Firm*—Ladas & Parry LLP

(57) ABSTRACT

A method and apparatus for separating a multi-channel mixed signal are provided. The method includes the steps of: a) transforming a temporal domain to a frequency domain by performing a discrete Fourier transform onto at least one of mixed signals inputted from an external device through multi-channel; b) estimating multi-decorrelation by calculating a plurality of cross power spectra for the mixed signal in the transformed frequency domain; c) estimating a separation coefficient of the mixed signal based on relative optimization in order to decorrelate the calculated cross power spectra, where the separation coefficient is serially updated; d) transforming the frequency domain to the temporal domain by performing an inverse discrete Fourier transform on the estimated separation coefficient in the temporal domain; and e) separating an original signal from the mixed signal by filtering the mixed signal using the separation coefficient of the transformed temporal domain.

11 Claims, 5 Drawing Sheets

CONVOLUTIVE BLIND SOURCE SEPARATION USING RELATIVE OPTIMIZATION

FIELD OF THE INVENTION

The present invention relates to a method and apparatus for separating a multi-channel mixed signal; and, more particularly, to a method and apparatus for a convolutive blind source separation using relative optimization, which estimate the separation coefficient of a mixed signal having predetermined conditions using a gradient method, a Newton's method and a trust-region method based on relative optimization for rapidly estimating the separation coefficient having a stable convergence when an original signal is separated from a mixed signal such as a sound or a voice signal collected from a real environment using a separation circuit without information about a sound source or a recording environment.

DESCRIPTION OF RELATED ARTS

Blind signal separation is a technology for extracting an original signal from a mixed signal. The goal of the blind signal separation is to extract the original signal from the mixed signal without requiring information about mixing environment and the original signal as a term 'Blind' expresses. The blind signal separation has been widely used in various fields such as sound/image processing, biomedical signal analysis and communication.

The blind signal separation has generally approached to its solution under an assumption that signals are independent from one anther. The assumption of the signal independency is a limitation to approach to the solution. Therefore, there have been researches in progress for finding the solution of a blind signal separation using a second order statistics of a mixed signal under an assumption that an original signal has no correlation in a spatial domain and has correlation in a temporal domain. That is, the solution of the blind signal separation is to obtain a separation circuit through estimating a mixed circuit, and to restore an original signal through the separation circuit.

Generally, signals collected from a real environment are modeled by a complex integral mixing circuit. However, it is very difficult to obtain a separation circuit for the complex integral mixing circuit. Especially, when the impulse response of a system to be model is considerably long, the separation circuit must lengthen a response thereof in order to estimate large amount of information. As described above, the complex integral mixing circuit has a problem that the convergence of the separation circuit coefficient is delayed due to the long response. Also, the separation circuit coefficient has a unstable convergence.

In order to overcome the program of the complex integral mixing circuit, a method of estimating the coefficient of the complex integral mixing circuit by transforming a temporal domain to a frequency domain was introduced. Based on this method, a method of separating signals through estimating the coefficient of a mixing circuit in a frequency domain using multi decorrelation was introduced in an article by L. Parra and C. Spence, entitled "Convolutive blind source separation of non stationary source", *IEEE Trans. Speech and Audio Processing*, vol. 8, no. 3, pp. 320-327, May 2000.

The Parra's method estimates the coefficient of the complex integral mixing circuit using a gradient method at a least square estimation method.

Although the separation coefficient is quickly converged because the known gradient method is used in the Parra's method, the Parra's method takes considerably long time to obtain a solution that optimizes in a linear convergence speed. Furthermore, the separation performance of the Parra's method is significantly degraded and becomes instable when the mixed signal is bad or in ill-condition due to a recording environment.

SUMMARY OF THE INVENTION

It is, therefore, an object of the present invention to provide a method and apparatus for a convolutive blind source separation using relative optimization, which estimate the separation coefficient of a mixed signal having predetermined conditions using a gradient method, a Newton's method and a trust-region method based on relative optimization for rapidly estimating the separation coefficient having a stable convergence when an original signal is separated from a mixed signal such as a sound or a voice signal collected from a real environment using a separation circuit without information about a sound source or a recording environment.

In accordance with an aspect of the present invention, there is provided a method for separating an original signal from a mixed signal, the method including the steps of: a) transforming a temporal domain to a frequency domain by performing a discrete Fourier transform onto at least one of mixed signals inputted from an external device through multi-channel; b) estimating multi-decorrelation by calculating a plurality of cross power spectra for the mixed signal in the transformed frequency domain; c) estimating a separation coefficient of the mixed signal based on relative optimization in order to decorrelate the calculated cross power spectra, where the separation coefficient is serially updated; d) transforming the frequency domain to the temporal domain by performing an inverse discrete Fourier transform on the estimated separation coefficient in the temporal domain; and e) separating an original signal from the mixed signal by filtering the mixed signal using the separation coefficient of the transformed temporal domain.

In accordance with another aspect of the present invention, there is also provided an apparatus for separating an original signal form a mixed signal including: a discrete Fourier transform unit for transforming a temporal domain to a frequency domain by performing a discrete Fourier transform on at least one of mixed signals inputted from an external device through multi-channel; a cross spectra matrix calculating unit for estimating multi-decorrelation by calculating a plurality of cross power spectra for the mixed signal in the transformed frequency domain; a separation coefficient calculating unit for estimating a separation coefficient of the mixed signal based on a relative optimization in order to decorrelate the calculated cross power spectra, where the separation coefficient is serially updated; an inverse discrete Fourier transform unit for transforming the frequency domain to the temporal domain by performing an inverse discrete Fourier transform on the estimated separation coefficient in the temporal domain; a separation unit for separating an original signal from the mixed signal by filtering the mixed signal using the separation coefficient of the transformed temporal domain.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Hereinafter, a method and apparatus for separating multi-channel mixed signal using relative optimization in accordance with a preferred embodiment of the present invention will be described in more detail with reference to the accompanying drawings.

A method and apparatus for separating a multi-channel mixed signal using relative optimization according to the present invention can rapidly estimate a separation coefficient having a stable convergence for a mixed signal having a predetermined condition when an original signal is separated from the mixed signal collected from a real environment, for example, a sound or a voice signal, using a separation circuit without information about a sound source or a recording environment.

In order to estimate the separation coefficient in the present invention, a gradient method, a Newton's method and a trust-region method are used based on a relative optimization. Hereinafter, a relative gradient method denotes a gradient method based on a relative optimization, a relative Newton's method denotes a Newton's method based on a relative optimization and a relative trust-region method denotes a trust-region method based on a relative optimization.

When an original signal is separated from the mixed signal collected from a real environment, for example, a sound or a voice signal, using a separation circuit without information about a sound source or a recording environment in the present invention, convolutive source separation is performed by transforming a temporal domain to a frequency domain in order to estimate a separation filter coefficient W, which denotes a separation coefficient.

Figure 1:
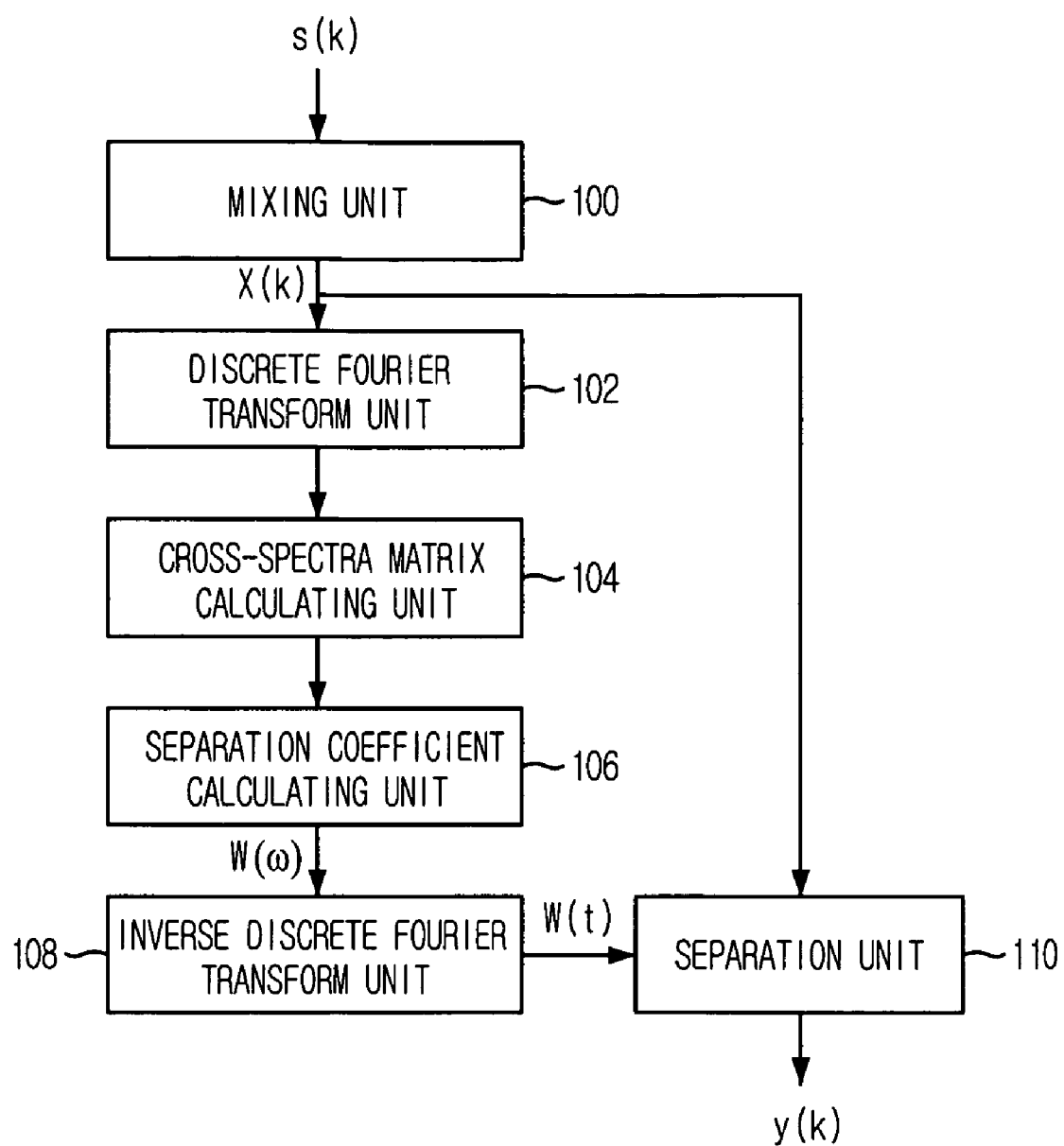
FIG. 1 is a block diagram illustrating an apparatus for separating a multi-channel mixed signal using a relative optimization in accordance with an embodiment of the present invention.

FIG. 1 is a block diagram illustrating an apparatus for separating a multi-channel mixed signal using a relative optimization in accordance with an embodiment of the present invention.

Referring to FIG. 1, the multi-channel mixed signal separating apparatus according to the present embodiment includes a mixing unit 100, a Discrete Fourier Transform unit 102, a cross-spectra matrix calculating unit, a separation coefficient calculating unit, an inverse Discrete Fourier Transform unit 108 and a separation unit 110.

Before describing the constituent elements of the present invention, signals defined in blind source separation will be described.

When M original signals collected from M microphones input to the mixing unit 100, an original signal S(t) and a mixed signal X(t) are defined as Eq. 1 and Eq. 2, respectively.

$$s(t)=[s_1(t), K, s_M(t)]^T \qquad \text{Eq. 1}$$

where S(t) denotes a vector having source signals s(t) as elements, and M denotes the number of source signals.

$$x(t)=[x_1(t), K, x_M(t)]^T \qquad \text{Eq. 2}$$

where X(t) denotes a vector having mixed signals x(t) as elements, and M denotes the number of mixed signals. Herein, it is assumed that the number of mixed signals is the same as the number of source signals.

In Eqs. 1 and 2, T denotes a transposed matrix operation of a vector matrix.

The mixed signal defined as Eq. 2 can be modeled in a temporal domain as Eq. 3.

$$x(t) = \sum_{\tau=0}^{P} A(\tau)s(t-\tau) \qquad \text{Eq. 3}$$

In Eq. 3, $A(\tau)$ is a room impulse response that shows the characteristic of a recording environment, and P denotes the length of an impulse response. Also, X(t) is a mixed signal vector, and S(t) is an original source signal vector.

The multi-channel mixed signal separating apparatus according to the present invention estimates a finite impulse response (FIR) that is consisted of the separation coefficients of the modeled mixed signal in the temporal domain as shown in Eq. 3 through the discrete Fourier transform unit 102, the cross-spectra matrix calculating unit 104, the separation coefficient calculating unit 106 and the inverse discreet fourier transform unit 108. Also, the multi-channel mixed signal separating apparatus according to the present invention estimates an original signal $Y(t)=[y_1(t),L,y_M(t)]$ by filtering the mixed signal modeled in the temporal domain as shown Eq. 3 through the known separation unit 110. The original signal is defined as Eq. 4.

$$y(t) = \sum_{\tau=0}^{Q} W(\tau)x(t-\tau) \qquad \text{Eq. 4}$$

In Eq. 4, $W(\tau)$ is a separation filter, and Q denotes a length of a separation filter. Y(t) denotes a vector having separated/estimated signals as elements, and X(t) denotes a mixed signal vector. Herein, $Y(t)=[y_1(t),L,y_M(t)]$, where M denotes the number of original sources.

As described above, the blind source separation is to estimate a finite impulse response filter coefficient $W(\tau)$ so that the estimated signal Y(t) becomes independent statistically. Hereinafter, a method of estimating a finite impulse response filter coefficient, that is, a separation coefficient $W(\tau)$ will be descried with reference to FIGS. 1 to 5 in detail.

As shown in FIG. 1, M original signal s(k) collected from M microphones input to the mixing unit 100 through a multi-channel. Then, the mixing unit 100 outputs the mixed signal x(k) to the discrete Fourier transform unit 102.

The Discrete Fourier Transform (DFT) unit 102 performs a Discrete Fourier Transform (DFT) on the mixed signal to transform a temporal domain to a frequency domain. Then, the DFT unit 102 outputs the mixed signal in the frequency domain to the cross-spectra matrix calculating unit 104.

The cross-spectra matrix calculating unit 104 calculates a plurality of cross-power spectra for the mixed signal in the frequency domain and outputs the calculated cross-power spectra to the separation coefficient calculating unit 106.

The separation coefficient calculating unit 106 calculates a separation coefficient $W(\tau)$ that makes the cross-power spectras decorrelated and outputs the calculated separation coefficient $W(\tau)$ to the inverse discrete Fourier transform unit 108. In order to calculate the separation coefficient in the present invention, a gradient method, a Newton's method and a trust-region method are used based on the relative optimization. The steps for estimating the separation coefficient according to the present invention will be described with reference to FIGS. 2 to 5 in detail.

Then, the inverse DFT 108 performs the inverse DFT on the separation coefficient in the frequency domain to transform the frequency domain to a temporal domain and outputs the separation coefficient $W(\tau)$ in the temporal domain to the separation unit 110.

The separation unit 110 separates an original signal from the mixed signal $X(k)$ by filtering the mixed signal $X(k)$ outputted from the mixing unit 110 using the separation coefficient $W(\tau)$ in the temporal domain.

Figure 2:
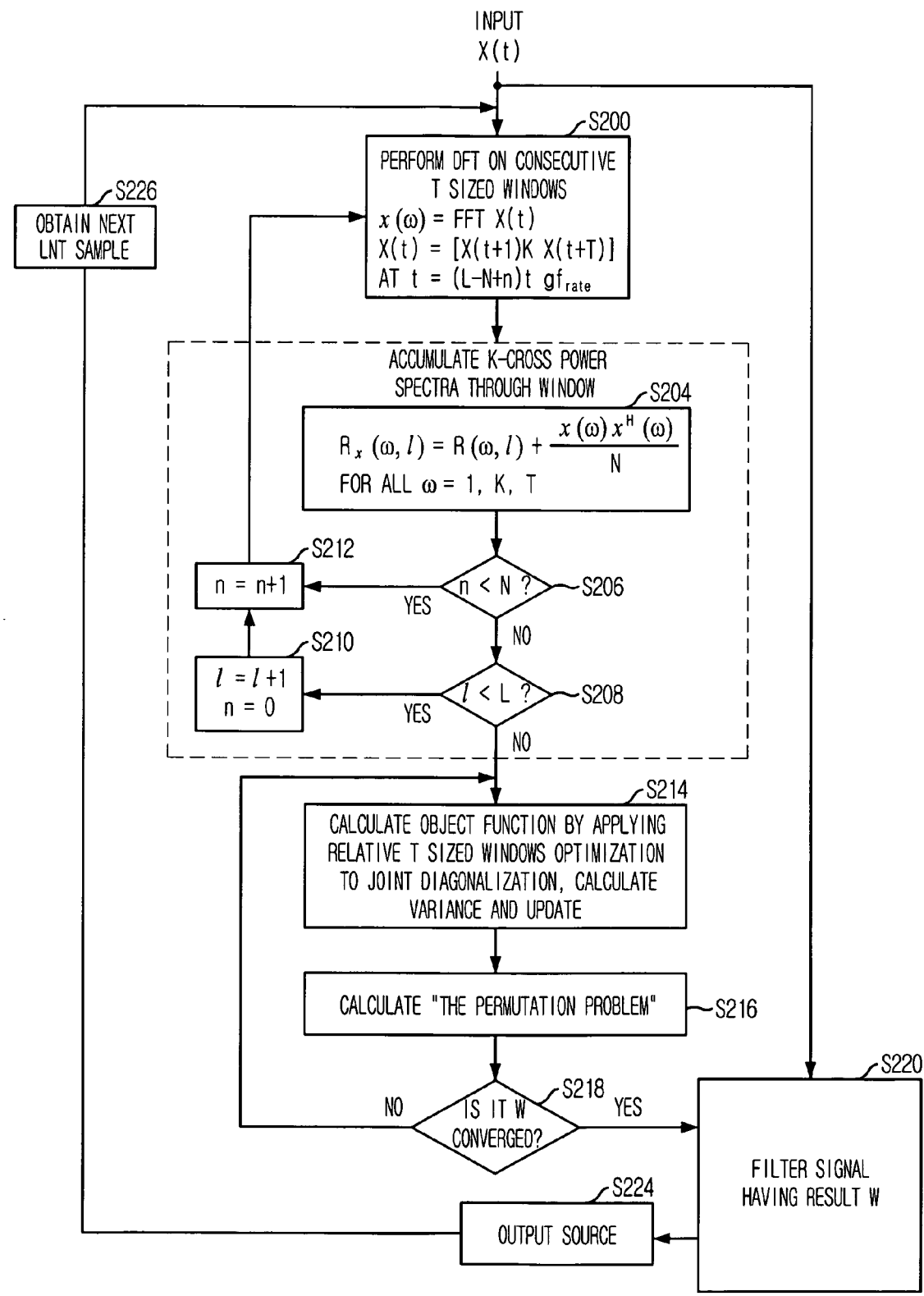
FIG. 2 is a flowchart describing a method for separating multi-channel mixed signal using relative optimization in accordance with an embodiment of the present invention.

FIG. 2 is a flowchart showing a method for separating multi-channel mixed signal using relative optimization in accordance with a preferred embodiment of the present invention.

As shown in FIG. 2, variance of convergence coefficient for the mixed signal inputted through multi-channels is calculated and a separation coefficient learning routine using multi-decorrelation is performed for updating a corresponding separation coefficient in the present invention.

At first, when the mixed signal $X(t)$ inputs from the mixing unit 100, the DFT unit 102 performs the DFT on the mixed signal in T-sized consecutive windows at step S200. Herein, the mixed signal is parsed into a plurality of windows having T samples of the input signal $X(t)$, and one DFT value is calculated for each window $X(t)$ for the mixed signal. That is, one DFT value is calculated for each window of T samples.

Then, the cross-spectra matrix calculating unit 104 accumulates K cross power spectra which are averaged through windows for the DFT value at steps of S204, S206, S208, S210 and S212. Herein, in order to accumulate L cross de correlation spectra, the DFT value is used. That is, each of L spectra is averaged through a length T sample window.

Meanwhile, the cross decorrelation estimation value for the abnormal signal is dependable to a time, and it is known that it will be considerably changed from an estimating portion that is NT period for a next estimating value. At the step S204, the cross decorrelation estimation value can be calculated by Eq. 5.

$$\hat{R}_x(\omega, t) = \frac{1}{N}\sum_{N=0}^{N-1} \chi(\omega, t+nT)\chi^H(\omega, t+nT)$$  Eq. 5

$$\chi(\omega, t+nT) = FFT\, X(t+nT)$$

$$X(t) = [x(t), \ldots, x(t+T-1)]$$

where $\hat{R}_x(\omega,t)$ denotes an estimated cross spectral density matrix, and $X(\omega)$ is an FFT of an input signal $X(t)$ in a window including a T sample. FFT $X(t+nT)$ is a value obtained by performing Fourier Transform onto $X(t+nT)$, while N denotes a period generating a cross spectral matrix for a mixed signal.

As described above, the separation coefficient calculating unit 106 estimates the separation coefficient $W(\tau)$ using the multi decorrelation calculated through Eq. 5 in the present invention. The least error estimating for estimating the separation coefficient can be expressed as Eq. 6.

$$\hat{W} = \underset{W}{\operatorname{argmin}} \sum_{\omega=1}^{T} \sum_{l=1}^{L} \beta_{\omega l} \|f(\omega, l)\|_F^2$$  Eq. 6 where W denotes a separation coefficient matrix; T denotes a length of a window; L denotes time; $\beta$ denotes a weight; and $\|f(\omega,l)\|_F^2$ denotes a Frobenius norm of $f(\omega,l)$.

In Eq. 6, $f(\omega,l) = \mathrm{off}\,(W(\omega)\hat{R}_x(\omega,l)W^H(\omega))$ denotes the decorrelation and "off" denotes an operator making diagonal elements to 0. Especially, Eq. 6 has a limitation as Eq. 7.

$$\sum_{\omega=1}^{T} \sum_{l=1}^{L} \beta_{\omega l} \|\hat{R}_x(\omega, l)\|_F^2 = 1$$  Eq. 7 where W denotes a separation coefficient matrix; T denotes a length of a window; L denotes time; $\beta$ denotes a weight; $\hat{R}_x(w,l)$ denotes an estimated cross spectral density matrix; and $\|f(\omega,l)\|_F^2$ denotes a Frobenius norm of $f(\omega,l)$.

Figure 3:
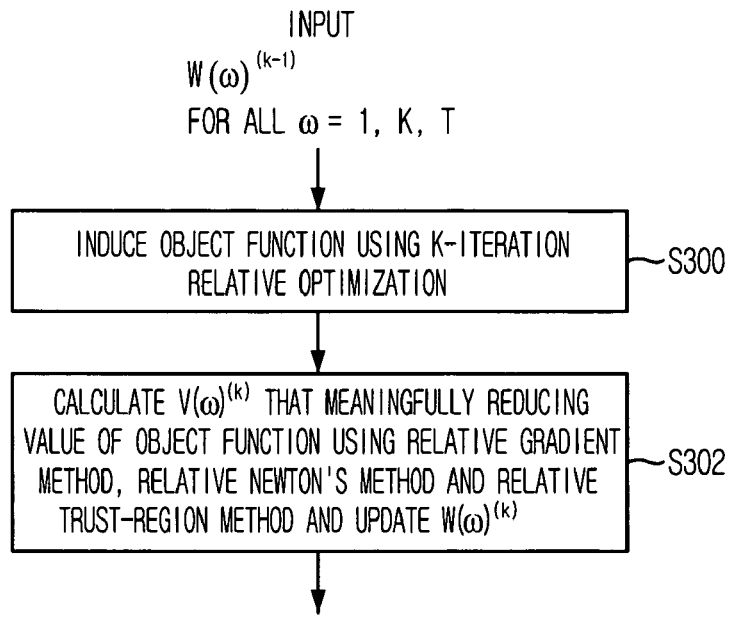
FIG. 3 is a flowchart describing a step for relative optimization based decorrelation.

Then, the separation coefficient calculating unit 106 calculates an object function by applying relative optimization of the calculated multi decorrelation into a joint diagonalization, calculates variance of the relative optimized convergence coefficient $[V(\omega)^{(k)}]$, and updates a separation coefficient $[W(\omega)^{(k)}]$ corresponding to the calculated variance at step S214. FIG. 3 shows the step S214 in detail.

FIG. 3 is a flowchart describing the step S214 for calculating the separation coefficient of FIG. 2, that is, a relative optimization based decorrelation step.

That is, the separation coefficient calculating unit 106 derives an object function using relative optimization for the calculated multi correlation, preferably, k-iteration relative optimization at step S300.

In the present invention, an object function, which is updated by multiplication as shown in Eq. 8, is derived using the relative optimization in order to make the separation coefficient $W(\omega)^{(k)}$ inverted in the frequency domain at every $k^{th}$ iteration. The advantage of the updated object functions like Eq. 8, which is introduced in the present invention, is not only to prevent the separation coefficient in the frequency domain from being a trivial solution but also to increase the convergence speed. Since the separation coefficient will be converged according to the equivalent property without regarding to the recording environment using the relative optimization in the present invention, a fast and stable separation circuit can be embodied even for a mixed signal is in a bad state or has ill condition according to the recording environment.

$$W(\omega)^{(k)} = (I+V)(\omega)^{(k)} W(\omega)^{(k-1)}$$  Eq. 8 where W denotes a matrix including separation coefficients as its elements; k denotes an iteration number; V denotes a predetermined matrix; and $\omega$ denotes a frequency.

In order to update for decorrelation or make the separation coefficient inverted in the frequency domain using the relative optimization as shown Eq. 8, an equation for estimating a least error like Eq. 9 is used for the convergence condition $V(\omega)^{(k)} \approx 0$ of the relative optimization convergence coefficient $V(\omega)^{(k)}$.

$$\hat{V} =$$  Eq. 9

$$\underset{v}{\operatorname{argmin}} \sum_{\omega=1}^{T} \sum_{l=1}^{L} \beta_{\omega l} \|\mathrm{off}((I+V(\omega))\Lambda_s(\omega, l)(I+V(\omega))^H)\|_F^2$$

where V denotes a matrix for updating a separation coefficient; T denotes a frequency; L denotes time; I denotes an identity matrix; $\Lambda_S$ denotes a covariance matrix of an original signal vector S; $\|\text{off}((I+V(\omega))\Lambda_S(\omega,l)((I+V(\omega))^H)\|_F^2$ denotes a Frobenius norm of $\text{off}((I+V(\omega))\Lambda_S(\omega,l)((I+V(\omega))^H)$. Also, $\text{off}((I+V(\omega))\omega_S(\omega,l)((I+V(\omega))^H)$ is $(I+V(\omega))\Lambda_S(\omega,L)((I+V(\omega))^H$-diagonal $((I+V(\omega))\Lambda_S(\omega,L)((I+V(\omega))^H)$ and is an operator for calculating a matrix where a diagonal element is 0 and the value and location of off-diagonal element is $(I+V(\omega))\Lambda_S(\omega,L)((I+V(\omega))^H$.

The Eq. 9 has a limitation as the following Eq. 10.

$$\sum_{\omega=1}^{T}\sum_{l=1}^{L} \beta_{\omega l}\|\Lambda_s(\omega,l)\|_F^2 = 1 \qquad \text{Eq. 10}$$

where T denotes a frequency; L denotes time; β denotes a weight; $\Lambda_S$ denotes a covariance matrix of an original signal vector S; and $\|\Lambda_S(\omega,l)\|_F^2$ denotes a Frobenius norm of $\Lambda_S(\omega,l)$.

Figure 5:
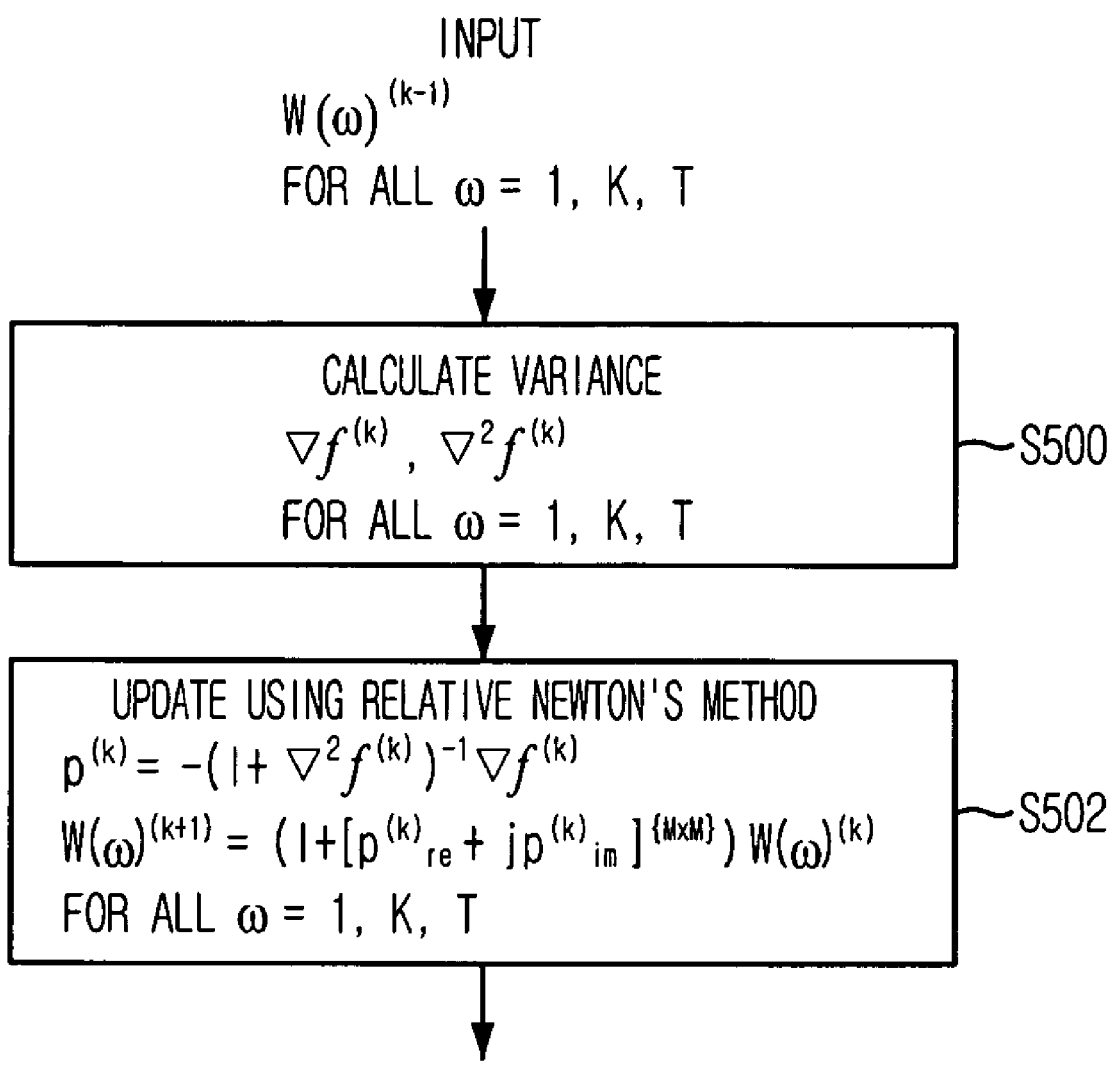
FIG. 5 is a flowchart describing a Newton's method used in FIG. 3.
Figure 6:
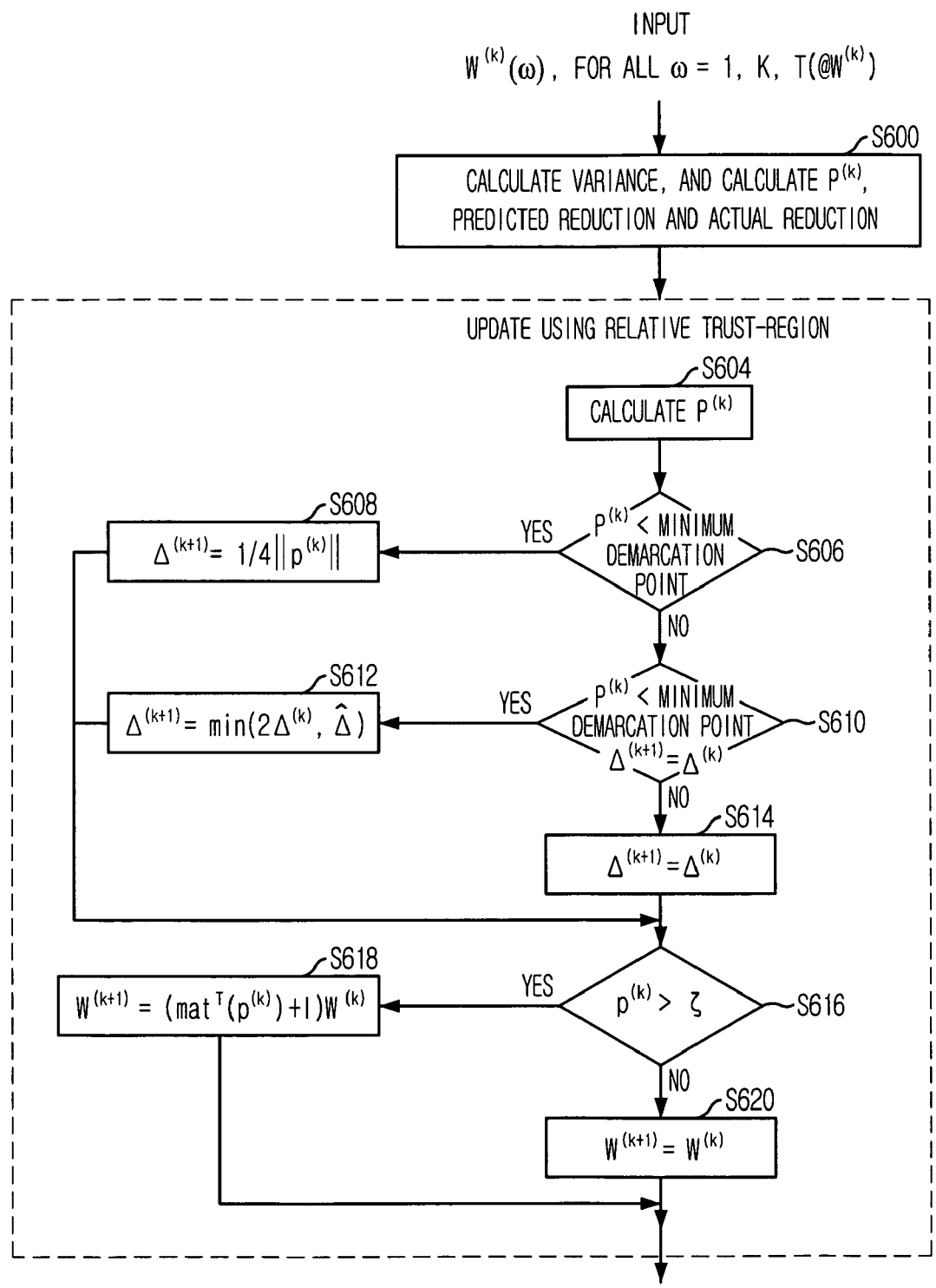
FIG. 6 is a flowchart describing a relative trust-region method used in FIG. 3.

After performing the step S300, the separation coefficient calculating unit 106 calculates variance of the relative optimization converging coefficient $V(\omega)^{(k)}$ that meaningfully reduces the value of the object function using the relative gradient method, the relative Newton's method and the relative trust-region method, and a separation coefficient $W(\omega)^{(k)}$ is calculated corresponding to the calculated variance at step S302. In the step S302, the step for calculating the relative optimization convergence coefficient using the relative gradient method is shown in FIG. 4, the step for calculating the relative optimization convergence coefficient using the relative Newton's method is shown in FIG. 5, and the step for calculating the relative optimization convergence coefficient using the relative trust-region method is shown in FIG. 6.

Figure 4:
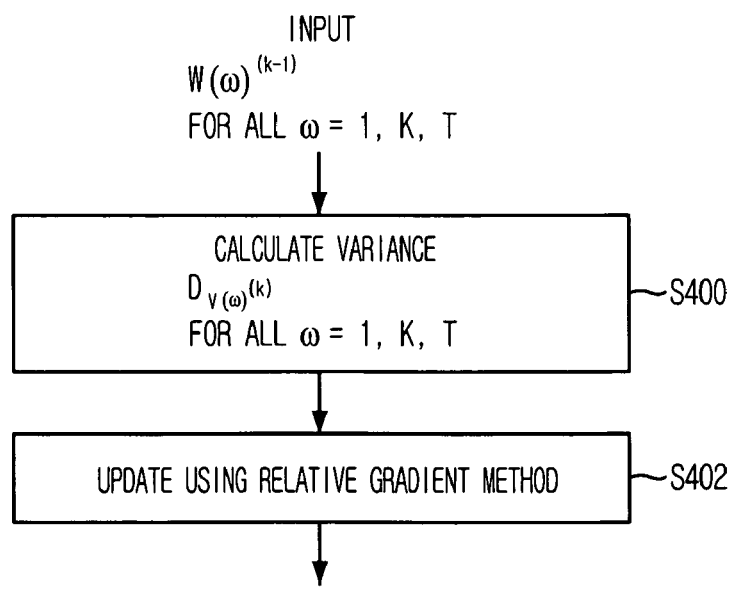
FIG. 4 is a flowchart describing a relative gradient method used in FIG. 3.

FIG. 4 is a flowchart describing a relative gradient method used in FIG. 3. The separation coefficient calculating unit 106 calculates the variance of the relative optimization convergence coefficient $V(\omega)^{(k)}$ using the known gradient method for the relative optimization object function at step S400, and the separation coefficient $W(\omega)^{(k)}$ is updated in the frequency domain using a known steepest descent method at step S402. Eq. 11 shows an equation for updating a separation coefficient using a relative gradient method. Herein, the relative gradient method is the known gradient method and the steepest descent method applied with the relative optimization as described above.

$$W(\omega)^{(k)} = (I - \eta D_{V(\omega)}^{(k)}))W(\omega)^{(k-1)} \qquad \text{Eq. 11}$$

where W is a matrix having separation coefficients as its elements; ω denotes a frequency; k denotes an iteration number; I denotes an identity matrix; η denotes a learning rate; and $D_{V(\omega)}$ denotes a gradient matrix calculated for update.

Since $$D_{V(\omega)} = \sum_{l=1}^{L}\beta_{\omega l}\{2\text{off}(\Lambda_s(\omega,l))\Lambda_s^H(\omega,l) + 2\text{off}(\Lambda_s^H(\omega,l))\Lambda_s(\omega,l)\}$$

$\Lambda_s^H(\omega,l) = \Lambda_s(\omega,l)$, the $D_{V(\omega)}$ can be modified as follows:

$$D_{V(\omega)} = \sum_{l=1}^{L}\beta_{\omega l}\{4\text{off}(\Lambda_s(\omega,l))\Lambda_s(\omega,l)\}$$

where $D_{V(\omega)}$ denotes a matrix for updating a separation coefficient; L denotes time; β denotes a weight; ω denotes a frequency; $\text{off}(\Lambda_S(\omega,l))$ is $\Lambda_S(\omega,L)$-diagonal $(\Lambda_S(\omega,L))$ and is an operator for calculating a matrix where a diagonal element is 0 and the value and location of off-diagonal element is $\Lambda_S(\omega,L)$; and $\Lambda_S$ denotes a covariance matrix of an original signal vector S.

Therefore, computation complexity is reduced to thereby shorten a program execution time. According to the updated and improved equation, the more the frequency domain is divided, the shorter the program execution time becomes.

FIG. 5 is a flowchart describing a Newton's method used in FIG. 3. In order to update a filter coefficient $W(\omega)^{(k)}$ in a frequency domain by applying the relative optimization into the typical Newton's method, a variance is calculated at step S500, and an updating equation is defined as Eq. 12 at step S502.

$$W(\omega)^{(k+1)} = (I + [p^{(k)}_{re} + jp^{(k)}_{im}]^{\{M \times M\}})W(\omega)^{(k)} \qquad \text{Eq. 12}$$

where W denotes a matrix having separation coefficients as its elements; ω denotes a frequency; k denotes an iteration number; I denotes an identify matrix; $P_{re}$ is a real value of a matrix p; $p_{im}$ is an imaginary value of p; M denotes a size of a matrix and the number of original sources, which is the number of original signals or mixed signals; and p denotes a matrix for updating a separation coefficient, which is expressed as follows.

In Eq. 12, $$p^{(k)} = -(I + \nabla^2 f^{(k)})^{-1}\nabla f^{(k)}$$

$$\nabla f^{(k)} = \begin{pmatrix} d_{V(\omega)^{(k)}re} \\ d_{V(\omega)^{(k)}im} \end{pmatrix} \triangleq \begin{pmatrix} \text{Re}\{vec(D_{V(\omega)^{(k)}})\} \\ \text{Im}\{vec(D_{V(\omega)^{(k)}})\} \end{pmatrix}$$

$$\nabla^2 f^{(k)} = \begin{bmatrix} \text{Re}\{H_{V(\omega)^{(k)}} + C_{V(\omega)^{(k)}}\} & -\Im m\{H_{V(\omega)^{(k)}} + C_{V(\omega)^{(k)}}\} \\ \Im m\{H_{V(\omega)^{(k)}} - C_{V(\omega)^{(k)}}\} & \text{Re}\{H_{V(\omega)^{(k)}} - C_{V(\omega)^{(k)}}\} \end{bmatrix}$$

where p denotes a matrix for updating a separation coefficient; $\nabla f$ is a matrix having a result of a gradient method as its elements; $\nabla^2 f$ is a matrix composed of the elements of Hessian matrix $H_V$ and $C_V$; $\text{Re}\{vec(D_{V(\omega)_{(k)}})\}$ is an operator of a real number; $\text{Im}\{vec(D_{V(\omega)_{(k)}})\}$ is an operator of a imaginary number; $vec(D_{V(\omega)_{(k)}})$ denotes a column vector produced by combining $D_{V(\omega)_{(k)}}$ column vectors.

and $$D_{V(\omega)} = \sum_{l=1}^{L}\beta_{\omega l}\{2\text{off}(\Lambda_s(\omega,l))\Lambda_s^H(\omega,l) + 2\text{off}(\Lambda_s^H(\omega,l))\Lambda_s(\omega,l)\}$$

$$H_{V(\omega)} = \sum_{l=1}^{L}\beta_{\omega l}\{2(\Lambda_s^*(\omega,l) \otimes \text{off}(\Lambda_s(\omega,l)) +$$

$$2(\Lambda_s^T(\omega,l) \otimes \text{off}(\Lambda_s^H(\omega,l)) + 2(\Lambda_s^T(\omega,l) \otimes I)P_{off}(\Lambda_s^*(\omega,l) \otimes$$

$$I) + 2(\Lambda_s^*(\omega,l) \otimes I)P_{off}(\Lambda_s^T(\omega,l) \otimes I)\}$$

$$C_{V(\omega)} = \sum_{l=1}^{L}\beta_{\omega l}\{2(\Lambda_s(\omega,l) \otimes I)P_{vec}P_{off}(\Lambda_s^*(\omega,l) \otimes I) +$$

$$2(\Lambda_s^H(\omega,l) \otimes I)P_{off}P_{vec}(\Lambda_s^T(\omega,l) \otimes I)\}$$

where ⊗ denotes a Kronecker product; $P_{vec}$ is an involuntary permutation matrix defined to satisfy $P_{vec}vec(W^T) = vec(W)$ and $P_{vec}^{-1} = P_{vec}$; and vec(W) forms a column vector by stacking the columns of W. Two diagonal matrixes having an order of $M^2 \times M^2$ are defined as $$p_{diag} \triangleq diag(vec(I^M)) = diag((e_1^T, \ldots, e_M^T)^T)$$

and $$p_{off} \triangleq diag(vec(\text{off } (I^{M \times M}))) = I^{M^2} - p_{diag};$$

D denotes a gradient matrix; $H_V$ and $C_V$ are Hessian matrixes; L denotes time; $\beta$ denotes a weight; off(M) is an operator for calculating a matrix where a diagonal element is 0 and the value and location of off-diagonal element is M; and H denotes a hermitian transpose; and * denotes a conjugation transpose.

Since $\Lambda_s^H(\omega,l) = \Lambda_s(\omega,l)$, the Eq. 12 can be modified as follows to thereby reduce the computation complexity.

$$D_{V(\omega)} = \sum_{l=1}^{L} \beta_{\omega l} \{4 \text{off}(\Lambda_s(\omega, l)) \Lambda_s(\omega, l)\}$$

$$H_{V(\omega)} = \sum_{l=1}^{L} \beta_{\omega l} \left\{ \begin{array}{l} 4(\Lambda_s^T(\omega, l) \otimes \text{off } (\Lambda_s(\omega, l)) + \\ 4(\Lambda_s^T(\omega, l) \otimes I) P_{off}(\Lambda_s^*(\omega, l) \otimes I) \end{array} \right\}$$

$$C_{V(\omega)} = \sum_{l=1}^{L} \beta_{\omega l} 4(\Lambda_s(\omega, l) \otimes I) P_{vec} P_{off}(\Lambda_s^*(\omega, l) \otimes I)$$

Also, as the trust region method accompanies Hessian calculation, the reduced computation complexity of the Hessian matrix including a gradient makes a great contribution to the improvement of convergence speed.

FIG. 6 is a flowchart describing a relative trust-region method used in FIG. 3. The separation coefficient calculating unit 106 calculates the variance of a relative optimization convergence coefficient $V(\omega)^{(k)}$ using the known trust-region method for the relative optimized object function, which is an agreement measure P(k) that denotes a ratio between predicted reduction and actual reduction at step S600 as well as using the relative gradient method shown in FIG. 4 and the relative Newton's method shown in FIG. 5. Then, the separation coefficient $W(\omega)^{(k)}$ of the frequency domain is updated using the known dogleg method which is one of trust-region methods at steps S604, S606, S608, S610, S612, S614, S616, S618 and S620.

At first, a model function $m^{(k)}$ is defined as Eq. 13.

$$\underset{\|p\| \leq \Delta^{(k)}}{\operatorname{argmin}} m^{(k)}(p) = f^{(k)} + [\nabla f^{(k)}]^T p + \frac{1}{2} p^T B^{(k)} p \qquad \text{Eq. 13}$$

where m denotes a model function; $\Delta$ denotes a radius of a trust-region; p denotes an arbitrary point; $\nabla f$ denotes a gradient; and B denotes a Hessian.

When $\Delta^{(k)} > 0$ is a radius of a trust-region, and a symmetric matrix $B^{(k)} \in R^{n^2 \times n^2}$ and $f^{(k)} = f(w^{(k)})$.

The agreement measure coefficient $\rho^{(k)}$ between the model function $m^{(k)}$ and the object function f is decided by a ratio of an actual reduction and a predicted reduction. It is calculated by Eq. 14.

$$\rho^{(k)} = \frac{f(v(\omega)^{(k)}) - f(v(\omega)^{(k+1)})}{m^{(k)}(0) - m^{(k)}(p^{(k)})} \qquad \text{Eq. 14}$$

wherein row is an agreement measure; f denotes an objective function; v denotes a motion distance; and m denotes a model function.

In Eq. 14, $$v(\omega)^{(k+1)} = v(\omega)^{(k)} + p^{(k)} \approx p^{(k)} (\because v(\omega)^{(k)} \approx 0)$$

$$v(\omega)^{(k)} = \begin{pmatrix} v(\omega)^{(k)} re \\ v(\omega)^{(k)} im \end{pmatrix} \triangleq \begin{pmatrix} \text{Re}(vec(v(\omega)^{(k)}) \\ \text{Im}\{vec(v(\omega)^{(k)})\} \end{pmatrix}$$

$$\nabla f^{(k)} = \begin{pmatrix} d_{V(\omega)^{(k)}re} \\ d_{V(\omega)^{(k)}im} \end{pmatrix} \triangleq \begin{pmatrix} \text{Re}\{vec(D_{V(\omega)^{(k)}})\} \\ \text{Im}\{vec(D_{V(\omega)^{(k)}})\} \end{pmatrix}$$

$$\nabla^2 f^{(k)} = \begin{bmatrix} \text{Re}\{H_{V(\omega)^{(k)}} + C_{V(\omega)^{(k)}}\} & -\mathfrak{Im}\{H_{V(\omega)^{(k)}} + C_{V(\omega)^{(k)}}\} \\ \mathfrak{Im}\{H_{V(\omega)^{(k)}} - C_{V(\omega)^{(k)}}\} & \text{Re}\{H_{V(\omega)^{(k)}} - C_{V(\omega)^{(k)}}\} \end{bmatrix}$$

Equations in Eq. 14 are defined as Eqs. 15, 16 and 17.

$$D_{V(\omega)} = \sum_{l=1}^{L} \beta_{\omega l} \left\{ \begin{array}{l} 2\text{off}(\Lambda_s(\omega, l))\Lambda_s^H(\omega, l) + \\ 2\text{off}(\Lambda_s^H(\omega, l))\Lambda_s(\omega, l) \end{array} \right\} \qquad \text{Eq. 15}$$

$$H_{V(\omega)} = \sum_{l=1}^{L} \beta_{\omega l} \left\{ \begin{array}{l} 2(\Lambda_s^*(\omega, l) \otimes \text{off } (\Lambda_s(\omega, l)) + \\ 2(\Lambda_s^T(\omega, l) \otimes \text{off}(\Lambda_s^H(\omega, l)) + \\ 2(\Lambda_s^T(\omega, l) \otimes I) P_{off}(\Lambda_s^*(\omega, l) \otimes I) + \\ 2(\Lambda_s^*(\omega, l) \otimes I) P_{off}(\Lambda_s^T(\omega, l) \otimes I) \end{array} \right\} \qquad \text{Eq. 16}$$

$$C_{V(\omega)} = \sum_{l=1}^{L} \beta_{\omega l} \left\{ \begin{array}{l} 2(\Lambda_s(\omega, l) \otimes I) P_{vec} P_{off}(\Lambda_s^*(\omega, l) \otimes I) + \\ 2(\Lambda_s^H(\omega, l) \otimes I) P_{off} P_{vec}(\Lambda_s^T(\omega, l) \otimes I) \end{array} \right\} \qquad \text{Eq. 17}$$

where $\otimes$ denotes a Kronecker product $P_{vec}$ is an involuntary permutation matrix defined to satisfy $P_{vec} vec(W^T) = vec(W)$ and $P_{vec}^{-1} = P_{vec}$; and vec(W) forms a column vector by stacking the columns of W. Two diagonal matrixes having an order of $M^2 \times M^2$ are defined as $$p_{diag} \triangleq diag(vec(I^M)) = diag((e_1^T, \ldots, e_M^T)^T)$$

and $$p_{off} \triangleq diag(vec(\text{off } (I^{M \times M}))) = I^{M^2} - p_{diag};$$

D denotes a gradient matrix; $H_V$ and $C_V$ are Hessian matrixes; L denotes time; $\beta$ denotes a weight; off(M) is M-diagonal (M) and is an operator for calculating a matrix where a diagonal element is 0 and the value and location of off-diagonal element is M; and H denotes a Hermitian transpose; and * denotes a conjugation transpose.

Herein, a matrix, a vector transpose, a complex conjugate transpose and Hermitian are expressed as $(.)^T$, $(.)^*$, $$(.)^H \triangleq ((.)^*)^T.$$

An identity matrix, a zero matrix, a zero vector and matrix consisted of only is are expressed as I, 0 and 1, respectively. E{.} denotes an expectation operator. The order of a vector or a matrix is expressed as a superscript like $I^M$. Frobenius norm and the trace of a matrix are expressed as $\|.\|_F^2(\|.\|_F^2=\text{tr}(AA^H))$, tr(.), respectively. A vector $\alpha$ consisted of diagonal terms of a matrix A is expressed as a=diag(A), and diag(a) denotes a diagonal matrix consisted of elements of a. vec(W) denotes a column vector produced by combining W column vectors. $\otimes$ denotes Kronecker product. $P_{vec}$ is an involuntary permutation matrix and it is defined to satisfy $P_{vec}\text{vec}(W^T) = \text{vec}(W)$ and $P_{vec}^{-1} = P_{vec}$. Two diagonal matrixes having an order of $M^2 \times M^2$ are defined as $$p_{off} \triangleq diag(vec(\text{off}((I^{M \times M}))) = I^{M^2} - p_{diag}$$

and $$p_{diag} \triangleq diag(vec(I^M)) = diag((e_1^T, \ldots, e_M^T)^T).$$

Herein, $e_m$ denotes an $m^{th}$ unit vector.

Based on Eq. 14, a size of a trust-region is decided using a dogleg method. That is, a ratio between actual reduction and predicted reduction is decided. Then, an agreement measure coefficient $\rho^{(k)}$ is calculated through the size of the trust-region.

Then, the separation coefficient $W(\omega)^{(k)}$ in the frequency domain is updated using the trust-region method with the calculated agreement measure coefficient $\rho^{(k)}$ as a parameter. That is, the separation coefficient $W(\omega)^{(k)}$ is updated through a result value of comparing a minimum demarcation point, a maximum demarcation point an $\zeta$. Eq. 18 shows an equation for updating the separation coefficient using the relative trust-region method. As described above, the relative trust-region method is the known trust-region method with the relative optimized decorrelation applied.

$$W(\omega)^{(k+1)} = (I+V(\omega)^{(k+1)})W(\omega)^{(k)} = (I+\text{mat}^T(p^{(k)}))W(\omega)^{(k)} \quad \text{Eq. 18}$$

where $\text{mat}^T(p^{(k)}) = [p^{(k)}_{re} + jp^{(k)}_{im}]^{\{M \times M\}}$

Then, the solution of a permutation problem is obtained according to a known multi-channel mixed signal separation rule for the separation coefficient updated through the above described steps. Until the separation coefficient is converged through the solution, the described separation coefficient updating steps are repeatedly performed. After the separation coefficient is converged, the inverse DFT unit 108 performs the inverse DFT on the converged separation coefficient to transform the frequency domain into the temporal domain. Then, the separation unit 110 estimates an original signal $Y(t) = [y_1(t), \ldots, y_M(t)]T$ based on the separation coefficient from the inverse DFT unit 108 by filtering the mixed signal modeled in the temporal domain like Eq. 3 at steps S216, S218, S220 and S224 in FIG. 2.

In order to use the relative optimization for multi decorrelation in the present invention, the relative gradient method, the relative Newton's method and the relative trust-region method.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

As described above, a separation coefficient having a stable convergence can be estimated for a mixed signal having a predetermined condition when an original signal is separated from a mixed signal collected from real environment such as sound and voice signal through a separation circuit without information about sound source and recording environment.

According to the present invention, an original signal can be stably and accurately extracted from an inferior mixed signal or a mixed signal having ill-condition.

The present application contains subject matter related to Korean patent application No. KR 2005-0107046, filed with the Korean Intellectual Property Office on Nov. 9, 2005, the entire contents of which being incorporated herein by reference.

While the present invention has been described with respect to certain embodiments, it will be apparent to those skilled in the art that various changes and modifications may be made without departing from the spirits and scope of the invention as defined in the following claims.

What is claimed is:

1. A computerized method for separating an original signal from a mixed signal, the computerized method comprising the steps of:
   a) transforming a temporal domain to a frequency domain by performing a discrete Fourier transform onto at least one of mixed signals inputted from an external device through multi-channel;
   b) estimating multi-decorrelation by calculating a plurality of cross power spectra for the mixed signal in the transformed frequency domain;
   c) estimating a separation coefficient of the mixed signal based on relative optimization in order to decorrelate the calculated cross power spectra, where the separation coefficient is serially updated;
   d) transforming the frequency domain to the temporal domain by performing an Inverse discrete Fourier transform on the estimated separation coefficient in the temporal domain;
   e) separating an original signal from the mixed signal using a processor by filtering the mixed signal using the separation coefficient of the transformed temporal domain; and
wherein the step c) includes the steps of:
   c1) deriving an object function by applying a relative optimization for the multi decorrelation calculated at the step b) into joint diagonalization; and
   c2) updating a corresponding separation coefficient while calculating variance of a relative optimization convergence coefficient by performing a gradient method, a Newton's method and a trust-region method on the derived object function.

2. The method as recited in claim 1, wherein in the step c1), the object function is derived using k-iteration relative optimization, where the object function is recently updated by multiplication based on a first equation in order to make the separation coefficient inverted in a frequency domain at ever $k^{th}$ iterations, where the first equation is expressed as:

$$W(\omega)^{(k)} = (I+V(\omega)^{(k)})W(\omega)^{(k-1)}$$

where W denotes a matrix including separation coefficients as its elements; k denotes an iteration number; V denotes a predetermined matrix; and ω denotes a frequency.

3. The method as recited in claim 2, wherein an equation for estimating a least error, which is a second equation, is used for the convergence condition $V(\omega)^{(k)} \approx 0$ of the relative optimization convergence coefficient in order to invert the separation coefficient in the frequency region through the third equation, where the second equation is expressed as:

$$\hat{V} = \arg\min_V \sum_{\omega=1}^{T} \sum_{l=1}^{L} \|\text{off}((I+V(\omega))\Lambda_s(\omega,l)((I+V(\omega))^H)\|_F^2$$

where V denotes a matrix for updating a separation coefficient; T denotes a frequency; L denotes time; I denotes an identity matrix; $\Lambda_S$ denotes a covariance matrix of an original signal vector S; $\|\text{off}((I+V(\omega))\Lambda_S(\omega,l)((I+V(\omega))^H)\|_F^2$ denotes a Frobenius norm of off((I+V(ω))$\Lambda_S$(ω,l)((I+V(ω))$^H$); and off((I+V(ω))$\Lambda_S$(ω,l)((I+V(ω))$^H$) is (I+V(ω))$\Lambda_S$(ω,L)((I+V(ω))$^H$ -diagonal ((I+V(ω))$\Lambda_S$(ω,L)((I+V(ω))$^H$) and is an operator for calculating a matrix where a diagonal element is 0 and the value and location of off-diagonal element is (I+V(ω))$\Lambda_S$(ω,L)((I+V(ω))$^H$.

4. The method as recited in claim 1, wherein in the step c-2) for updating a corresponding separation coefficient while calculating variance of a relative optimization convergence coefficient by performing a gradient method, a third equation is used for calculating variance of a relative optimization convergence coefficient using the gradient method and updating a corresponding separation coefficient in a frequency domain using a maximum gradient method, where the third equation is expressed as:

$$W(\omega)^{(k)} = (I - \eta D_{V(\omega)}^{(k)}) W(\omega)^{(k-1)}$$

where $$D_{V(\omega)} = \sum_{l=1}^{L} \beta_{\omega l} \{4\text{off}(\Lambda_s(\omega,l))\Lambda_s(\omega,l)\};$$

where W is a matrix having separation coefficients as its elements; ω denotes a frequency; k denotes an iteration number; I denotes an identity matrix; η denotes a learning rate; and $D_{V(\omega)}$ denotes a gradient matrix calculated for update.

5. The method as recited in claim 1, wherein in the step c-2) for updating a corresponding separation coefficient while calculating variance of a relative optimization convergence coefficient by performing the Newton's method, a fourth equation is used for calculating variance of a relative optimization convergence coefficient using the Newton's method and updating a corresponding separation coefficient in a frequency domain using a maximum Newton's method, where the fourth equation is:

$$W(\omega)^{(k+1)} = (I + [p^{(k)}_{re} + j p^{(k)}_{im}]^{\{M \times M\}}) W(\omega)^{(k)}$$

where W denotes a matrix having separation coefficients as its elements; ω denotes a frequency; k denotes an iteration number; I denotes an identify matrix; $p_{re}$ is a real value of a matrix p; $p_{im}$ is an imaginary value of p; M denotes a size of a matrix and the number of original sources, which is the number of original signals or mixed signals; and p denotes a matrix for updating a separation coefficient, which is expressed as follows:

$$p^{(k)} = -(I + \nabla^2 f^{(k)})^{-i} \nabla f^{(k)}$$

$$\nabla f^{(k)} = \begin{pmatrix} d_{V(\omega)^{(k)}re} \\ d_{V(\omega)^{(k)}im} \end{pmatrix} \triangleq \begin{pmatrix} \text{Re}\{vec(D_{V(\omega)^{(k)}})\} \\ \text{Im}\{vec(D_{V(\omega)^{(k)}})\} \end{pmatrix}$$

$$\nabla^2 f^{(k)} = \begin{bmatrix} \text{Re}\{H_{V(\omega)^{(k)}} + C_{V(\omega)^{(k)}}\} & -\Im\{H_{V(\omega)^{(k)}} + C_{V(\omega)^{(k)}}\} \\ \Im\{H_{V(\omega)^{(k)}} - C_{V(\omega)^{(k)}}\} & \text{Re}\{H_{V(\omega)^{(k)}} - C_{V(\omega)^{(k)}}\} \end{bmatrix}$$

, where $$D_{V(\omega)} = \sum_{l=1}^{L} \beta_{\omega l} \{4\text{off}(\Lambda_s(\omega,l))\Lambda_s(\omega,l)\}$$

$$H_{V(\omega)} = \sum_{l=1}^{L} \beta_{\omega l}$$

$$\begin{Bmatrix} 4(\Lambda_s^T(\omega,l) \otimes \text{off}(\Lambda_s(\omega,l)) + \\ 4(\Lambda_s^T(\omega,l) \otimes I) P_{off}(\Lambda_s^*(\omega,l) \otimes I) \end{Bmatrix}$$

$$C_{V(\omega)} = \sum_{l=1}^{L} \beta_{\omega l} 4(\Lambda_s(\omega,l) \otimes I) P_{vec} P_{off}(\Lambda_s^*(\omega,l) \otimes I).$$

6. The method as recited in claim 1, wherein in the step c2) for updating a corresponding separation coefficient while calculating variance of a relative optimization convergence coefficient by performing the trust-region method, an agreement measure coefficient is decided by a ratio between actual reduction and predicted reduction using the trust-region method with the derived object function, the variance of the relative optimization convergence coefficient is calculated using a dogleg method based on the decided agreement measure coefficient, and a corresponding separation coefficient in a frequency domain is updated.

7. The method as recited in claim 6, wherein a model function $m^{(k)}$ like an fifth equation is used to decide the agreement measure coefficient of the derived object function, where the fifth equation is expressed as:

$$\arg\min_{\|p\| \leq \Delta^{(k)}} m^{(k)}(p) = f^{(k)} + [\nabla f^{(k)}]^T p + \frac{1}{2} p^T B^{(k)} p$$

where $\Delta^{(k)} > 0$ is a radius of a trust-region; a symmetric matrix $B^{(k)} \in R^{n^2 \times n^2}$
and $f^{(k)} = f(w^{(k)})$; m denotes a model function; Δ denotes a radius of a trust-region; p denotes an arbitrary point; $\nabla f$ denotes a gradient; and B denotes a Hessian.

8. The method as recited in claim 7, wherein the agreement measure coefficient between the derived object function and the model function is decided by an sixth equation which is expressed as:

$$\rho^{(k)} = \frac{f(v(\omega)^{(k)}) - f(v(\omega)^{(k+1)})}{m^{(k)}(0) - m^{(k)}(p^{(k)})}$$

wherein row is an agreement measure; f denotes an objective function; v denotes a motion distance; m denotes a model function; and $$v(\omega)^{(k+1)} = v(\omega)^{(k)} + p^{(k)} \approx p^{(k)}(Q v(\omega)^{(k)} \approx 0)$$

$$v(\omega)^{(k)} = \begin{pmatrix} v(\omega)^{(k)}\text{re} \\ v(\omega)^{(k)}\text{im} \end{pmatrix} \triangleq \begin{pmatrix} \text{Re}\{vec(v(\omega)^{(k)})\} \\ \text{Im}\{vec(v(\omega)^{(k)})\} \end{pmatrix}$$

$$\nabla f^{(k)} = \begin{pmatrix} d_{V(\omega)^{(k)}re} \\ d_{V(\omega)^{(k)}im} \end{pmatrix} \triangleq \begin{pmatrix} \text{Re}\{vec(D_{V(\omega)^{(k)}})\} \\ \text{Im}\{vec(D_{V(\omega)^{(k)}})\} \end{pmatrix}$$

$$\nabla^2 f^{(k)} = \begin{bmatrix} \text{Re}\{H_{V(\omega)^{(k)}} + C_{V(\omega)^{(k)}}\} & -\Im m\{H_{V(\omega)^{(k)}} + C_{V(\omega)^{(k)}}\} \\ \Im m\{H_{V(\omega)^{(k)}} - C_{V(\omega)^{(k)}}\} & \text{Re}\{H_{V(\omega)^{(k)}} - C_{V(\omega)^{(k)}}\} \end{bmatrix}.$$

9. The method as recited in claim 6, wherein an equation for updating a separation coefficient using the trust-region method is a seventh equation which is expressed as:

$$W(\omega)^{(k+1)} = (I + V(\omega)^{(k+1)})W(\omega)^{(k)} = (I + \text{mat}^T(p^{(k)}))W(\omega)^{(k)}$$

where $\text{mat}^T(p^{(k)}) = [p^{(k)}_{re} + jp^{(k)}_{im}]^{\{M \times M\}}$.

10. The method as recited in claim 7, further comprising reducing computation complexities of a gradient computation and a Hessian matrix computation based on $\Lambda_s^H(\omega,l) = \Lambda_s(\omega,l)$.

11. An apparatus having a processor for separating an original signal from a mixed signal, comprising:
a discrete Fourier transform unit for transforming a temporal domain to a frequency domain by performing a discrete Fourier transform on at least one of mixed signals inputted from an external device through multi-channel;
a cross spectra matrix calculating unit for estimating multi-decorrelation by calculating a plurality of cross power spectra for the mixed signal in the transformed frequency domain;
a separation coefficient calculating unit for estimating a separation coefficient of the mixed signal based on a relative optimization in order to decorrelate the calculated cross power spectra, where an object function is derived by applying a relative optimization for the estimated multi decorrelation into joint diagonalization, and the separation coefficient is serially updated while calculating variance of a relative optimization convergence coefficient by performing a gradient method, a Newton's method and a trust-region method on the derived object function;
an inverse discrete Fourier transform unit for transforming the frequency domain to the temporal domain by performing an inverse discrete Fourier transform on the estimated separation coefficient in the temporal domain;
a separation unit for separating an original signal from the mixed signal by filtering the mixed signal using the separation coefficient of the transformed temporal domain.

\* \* \* \* \*